United States Patent

[11] 3,620,514

| | | | | |
|---|---|---|---|---|
| [72] | Inventor | Lewis J. Geiger, Jr.<br>Edison, N.J. | [56] | References Cited |
| [21] | Appl. No. | 864,840 | | UNITED STATES PATENTS |
| [22] | Filed | Oct. 8, 1969 | 1,513,828  11/1924  Kernohan et al.   263/52 |
| [45] | Patented | Nov. 16, 1971 | | |
| [73] | Assignee | Air Reduction Company Incorporated<br>New York, N.Y. | | |

*Primary Examiner*—John J. Camby
*Attorneys*—Francis B. Henry, Edmund W Bopp and H. Hume Mathews

[54] FUEL-AIR FIRED FURNACE WITH SUPPLEMENTAL OXYGEN-FUEL BURNER
15 Claims, 5 Drawing Figs.

[52] U.S. Cl. ............................................... 263/40 R,
110/28 A, 263/52
[51] Int. Cl. ................................................ F27b 3/02
[50] Field of Search............................................ 110/28 A;
263/40 R, 43, 52

ABSTRACT: A furnace for melting a load of metal scrap containing pig iron, etc., having at one end two laterally spaced main coal-air burners for directing flames to the load, the projected axes of the respective burners converging and intersecting approximately at the midportion of the furnace near the load level, and a supplemental oxygen-fuel burner of heat generating capacity materially less than the combined capacities of the main coal-air burners, located between and beneath the main burners for directing an oxygen-fuel flame approximately at the point of intersection of the coal-air flames.

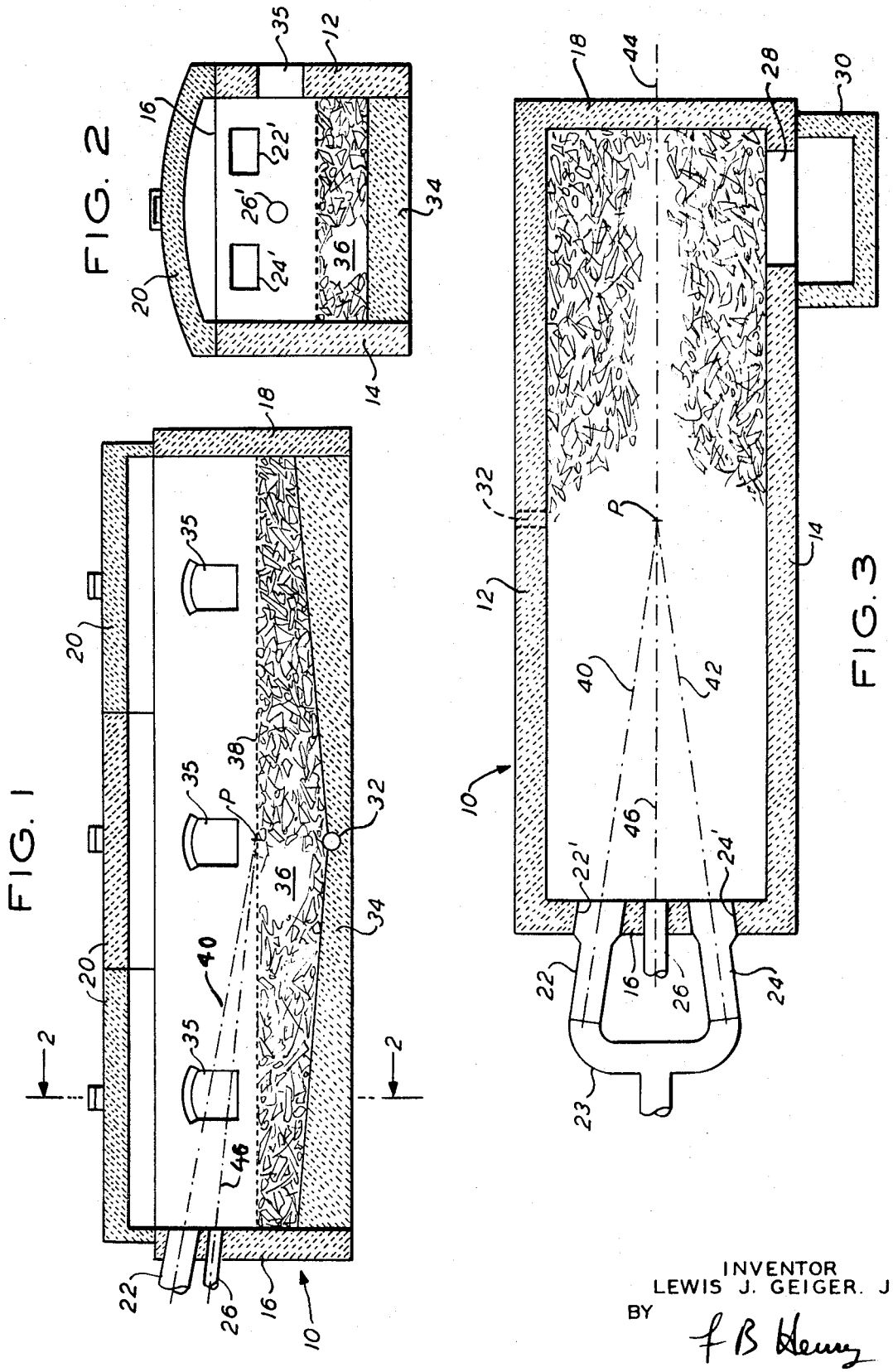

INVENTOR
LEWIS J. GEIGER, JR
BY
*F.B. Henry*
ATTORNEY

FUEL-AIR FIRED FURNACE WITH SUPPLEMENTAL OXYGEN-FUEL BURNER

BACKGROUND OF THE INVENTION

It has been proposed to use auxiliary oxygen-fuel burners in fuel-air fired heaters, specifically cement kilns, for obtaining high load-working temperatures in excess of 3,300° F., for example. In the given example, an auxiliary oxygen-fuel flame is directed at an offset angle toward a main fuel-air flame and into the quadrant thereof, considering the transverse cross section of the main flame, that is closest to the kiln load. The purpose here is to generate unusually high temperatures within that one quadrant while the remainder of the flame functions as a reflector for intensifying load heating and also in effect, as a shield for protecting the kiln walls from the effects of the intensified heat. In other heating applications, auxiliary oxygen has been used in combination with fuel-air burners for space heaters, rocket-type burners such as described in U.S. Pat. No. 3,092,166 granted June 4, 1963 to Thomas L. Shepherd, and similar equipment, for in general increasing the rate of combustion and heat output.

Prior attempts to use auxiliary oxygen in certain furnace types involving metallurgy, such as coal-fired furnaces for melting scrap iron, etc. have not heretofore achieved desired improvement for various reasons such as load temperature control difficulties, excessive oxidation of alloy elements in the iron with poor quality control of the melt, etc. The conventional coal-fired furnace for meltdown of iron at a preferred tap temperature of about 2,600° F., has numerous disadvantages including (1) slow ignition and an extended firing-up period for stabilizing the coal-air flames, (2) incomplete combustion with accompanying poor heat transfer to the load, oxidizing furnace atmosphere, higher fuel costs and objectionable air pollution, and (3) long meltdown and heating time usually ranging from 6 to 8 hours and in some instances, due to poor heat transfer characteristics, etc. up to 16 hours. As the time factor is very important in commercial production, the usual operating schedule will be described briefly. In this type of furnace the coal-air burners are fired at about 22 million B.t.u./hr. until the entire charge is melted and visibly fluid as indicated by molten bath circulation. This ordinarily requires 4 to 5 hours. Alloy additions are then added and firing is continued for another 2 to 3 hours or until a metal tap temperature of about 2,600° F. is reached. Accordingly, the total finish charge-to-tap time ordinarily is from 6 to 8 hours.

The present invention is concerned with improved furnace operation for increasing the rate of heat transfer to the load, avoiding an oxidizing furnace atmosphere and ensuring efficient use of furnace fuel and furnace equipment.

SUMMARY OF THE INVENTION

In accordance with the invention, a load-heating furnace having at one end a pair of main horizontally spaced fuel-air burners, such as coal-air burners, is also provided with a supplemental oxygen-fuel burner that has a heat-generating capacity of 25 percent or less, and preferably about 10 percent of the combined main burner capacities. The projected axes of the coal-air burners converge near the load surface at about the midportion of the furnace for improved distribution of the heating flames, and the supplemental burner is located beneath the main burners in substantially symmetrical relation thereto. The projected axis of the supplemental burner also extends to the convergence of the main burner axes for directing an oxygen-fuel flame progressively into the coal-air flames. With this combination, the main coal-air flames are stabilized for normal combustion within materially less time than ordinarily required, practically complete combustion is achieved, and the release of heat to the load from coal-air combustion is increased by synergistic interaction between the flames for markedly improving the rate of heat transfer to the load.

A principal object of the invention therefore, is to provide an improved furnace heating system that is capable of supplying heat to a furnace load at a comparatively high transfer rate, while maintaining efficient utilization of fuel and control of furnace atmosphere by accelerating the combination of oxygen with the fuel.

A further object of the invention is to provide an improved coal-fired furnace system of the character indicated above, wherein the load heating effect of converging coal-air flames is augmented to a marked extent by an impinging oxygen-fuel flame having per se comparatively low heat-generating capacity.

A further and related object of the invention is to provide an improved coal-fired type furnace for iron meltdown wherein oxygen-fuel flame is projected into at least two converging main coal-air flames for achieving high rate of heat release to the furnace load from the interacting flames with material reduction of the meltdown time, and substantially complete fuel combustion along with a nonoxidizing furnace atmosphere.

Other features and objects will be apparent to those skilled in the art from the following description taken in connection with the accompanying drawing.

BRIEF DESCRIPTION OF THE DRAWINGS

FIG. 1 is a view in elevation of an iron-melting furnace embodying the present invention;

FIG. 2 is a sectional view taken along the line 2—2 of FIG. 1;

FIG. 3 is a plan view of the furnace shown in FIG. 1, and

DESCRIPTION OF THE PREFERRED EMBODIMENT

Figure 4:
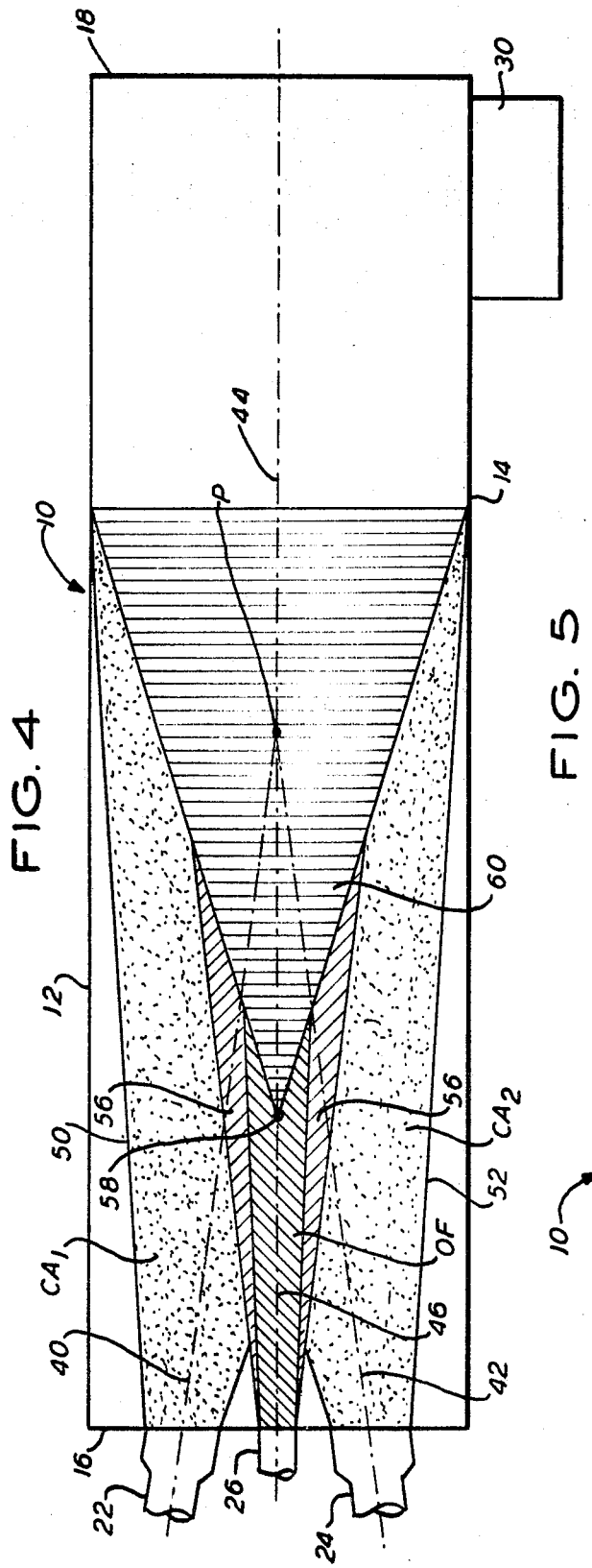
FIGS. 4 and 5 are analytic views in plan and elevation respectively, of the general pattern of the interacting furnace flames.

FIG. 1 illustrates by way of example only, the general configuration of a conventional coal-air furnace 10 to which the present invention can be applied for meltdown of iron scrap and the like. The furnace as shown, is in the form of an elongated rectangular box with thick refractory brick walls. The sidewalls 12, 14 and the end walls 16, 18 support a refractory domed roof or cover that consists of separately removable sections 20, each adapted to be lifted out of place for load charging of the furnace. Usually this type of furnace is fired by two coal-air burners 22 and 24 which are mounted for exhaust through rectangular openings 22' and 24' respectively, in the end wall 16 for projecting flames over the load surface. The burners are fed with powdered coal and compressed air through a common manifold at 23. Near the opposite end wall 18, the sidewall 14 has an exhaust flue opening 28 for venting the spent gaseous products of combustion into a stack 30 alongside the furnace. A taphole 32 is located in the wall 12 approximately at the longitudinal midportion thereof and at the lowest level of the dished bottom wall 34 for removing the liquid metal at completion of meltdown. Observation windows in the wall 12 are shown at 35.

The furnace so far described represents a typical form of iron-melting furnace in common use. In its operation, the usual load charge consists of from 25,000 to 50,000 pounds of cast iron, ferroalloys, scrap, foundry returns and pig iron. The relative amounts of each kind of metal in the charge depend on the desired composite chemical analysis of the melt. A main purpose of selecting the load for meltdown is to arrive at the preferred final analysis with least possible additions of finishing alloys, thereby minimizing certain undesired effects of late alloy "inoculations." In metallurgy "inoculation of cast iron" refers to alloy additions used to impart certain structural characteristics to the cast iron, over and above the chemical effects. Accordingly, it will be apparent that the quality of the furnace product depends on limiting to the extend possible oxidation of the alloy elements during meltdown and subsequent heating of the melt.

In applying the invention in one of its simpler forms to the conventional coal-air fired furnace described above, a supplemental oxygen-fuel burner generally indicated at 26 is also mounted in the end wall 16 symmetrically beneath the coal-air burners 22 and 24. The projected longitudinal axes of the three burners 22, 24 and 26 are directed so as to converge above the furnace load for achieving improved interaction and heating effect of the merging coal-air and oxygen-fuel flames as presently described.

Initially the furnace is charged from the top with a load of scrap metal 36 to a working level such as indicated at 38, and the roof cover sections 20 are returned to their normally closed positions. The furnace is fired for meltdown of the load in accordance with the invention by first igniting the oxygen-fuel burner 26, and then turning on the coal-air burners 22 and 24. The projected hot oxygen-fuel flame is effective to ignite and stabilize the flames of the coal-air burners within an unusually short time, generally within 4 to 5 minutes. The three flames now established are directed by the respective burners to merge as they converge toward the middle of the furnace slightly above or at the working level 38 of the load, FIGS. 1 and 3, for most effective application of the heating flames to the load.

In particular, the coal-air type burners 22 and 24, hereinafter termed the "main" burners, are symmetrically mounted in the upper part of the wall 16 in horizontally spaced relation, FIGS. 2 and 3. These burners can be of any suitable type for feeding into the furnace powdered coal and pressurized air in desired mixture. The longitudinal axes 40 and 42 of the main burners may be horizontally disposed or, as in the example shown, depressed below the horizontal by a small angle, such as about 15° for a furnace length of 20 feet; the axes are also inclined toward the longitudinal plan axis 44 of the furnace, FIG. 3, so as to intersect thereon at a midpoint P, generally at the load surface, FIG. 1; i.e. in vertical distance, the axes 40 and 42 intersect about 2 feet above the taphole 32 for the given example. The main burners are normally fired for combined heat generation of 22 million B.t.u./hr. at a steady rate, assuming a furnace charge of from about 25,000 to 50,000 pounds.

The thermal or heat transfer action of the main burner flames on the load is made much more effective by the third or supplemental burner 26 that projects along its longitudinal axis 46 a single oxygen-fuel flame centrally from beneath into the converging mass of main flame at P. The oxygen-fuel burner 26 which may be of the known rocket-burner type as disclosed for example in U.S. Pat. No. 3,135,626 granted June 2, 1964 to Moen et al. can use a desired mixture of commercially pure oxygen and natural gas for firing at about 2.5 million B.t.u./hr., i.e. approximately 10 percent of the combined normal firing rate of the main coal-air burners. In this instance, oxygen was supplied at 100 percent of the stoichiometric requirement for the complete combustion of the natural gas used, or about 5,000 s.c.f.h. (standard cubic feet per hour).

FURNACE OPERATION AND PERFORMANCE

Figure 5:
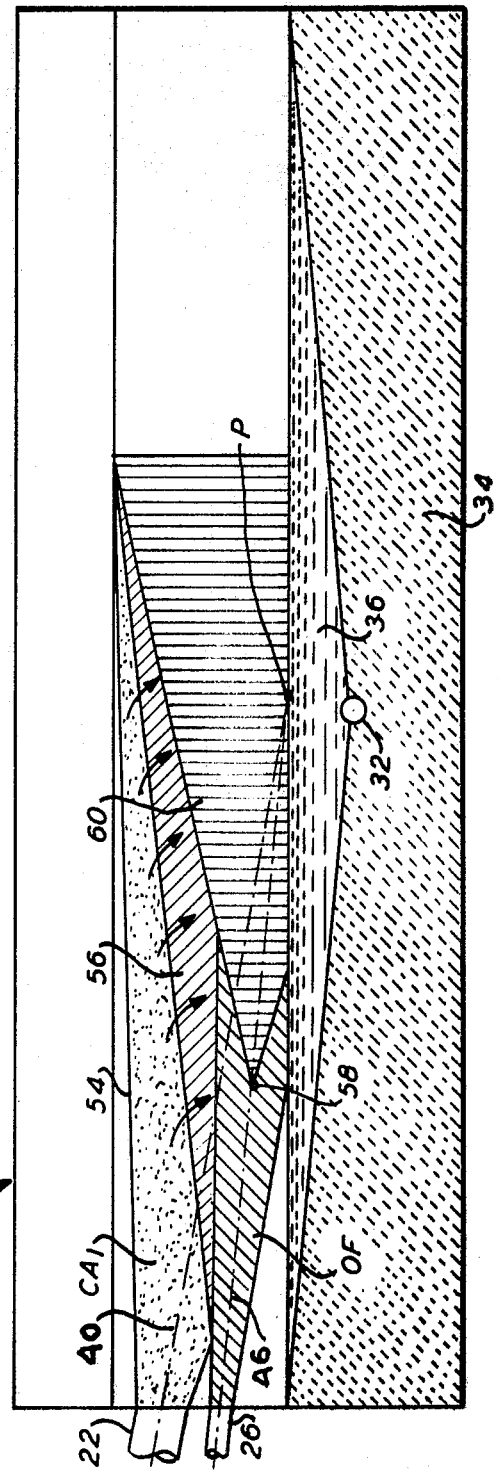

The arrangement of the supplemental and main burners for convergence and merging of the respective flames as described above, results in an effective pattern of flame interaction represented by the analytical charts of FIGS. 4 and 5. Considering first the individual characteristics of the flames, the supplemental oxygen-fuel flame OF is blue in color indicating complete combustion and is comparatively "stiff" with clean demarcation lines for about 5 feet from the burner, i.e. the flame has the characteristics of a strong sound-velocity jet with little tendency to "bloom" or become "bushy." The main coal-air flames $CA_1$ and $CA_2$ on the other hand are sooty with black smoke and a red glowing interior, indicating incomplete combustion. These flames expand in cross section and tend to become bushy a short distance beyond the burners; accordingly, there is actual merging of adjacent portions of the main flames well in advance of the intersection point P of the respective projected axes.

Referring particularly to FIG. 4, the lateral boundaries of the main flames $CA_1$ and $CA_2$ that correspond to the converging burner axes 40 and 42, are generally indicated at 50 and 52 respectively. In practice, the flame boundaries have irregular limits and, as the flame cross-sectional areas expand, extend approximately parallel to the sidewalls 12 and 14 respectively of the furnace. FIG. 5 represents the upper boundaries 54 of the main flames also as extending approximately parallel to the domed furnace roof.

Returning to FIG. 4, the supplemental stiff flame OF at about 5,000° F. extending beneath the main flames $CA_1$ and $CA_2$ is represented as progressively contacting with the lower portions of the expanding main flames throughout a peripheral coal ignition and oxidizing region 56 of diverging cross-sectional area. That is, the expanding flames $CA_1$ and $CA_2$ tend gradually to envelop the lower supplemental flame OF throughout the upper semiperipheral portion thereof. This enveloping contact action is enhanced by the aspirating action of the oxygen-fuel flame OF which tends to draw downwardly the sooty main flames into contact with the hot oxygen-fuel flame. FIG. 5 represents by direction arrows the downward flow of unburned coal and incandescent carbon particles into the oxidizing region 56 described above.

As the flames move toward the center of the furnace, the oxygen-fuel flame OF starts to diffuse at a midpoint 58 (the approximate end of the visible flame) between the end wall 16 and the taphole 32, and to mix generally with the main flames throughout a diverging, partly conical-shaped region 60 that extends toward the flue end of the furnace. Within this region of final flame mixing, combustion is completed and the end products of combustion are vented, mainly as $CO_2$ and $H_2O$ vapor, from the furnace stack 30 to atmosphere, FIG. 3.

The extended heating effect on the furnace load of the progressively expanding flame contacting and oxidizing regions 56 and 60 will be apparent from FIG. 5. Complete combustion has initially taken place well in advance of the center of the furnace load and continues over an expanding area past the center, thereby concentrating the more intense part of the furnace heat over the load surface along an intermediate area spanning the taphole 32 where it is most effective. As mentioned above, the interaction of the supplemental and main flames involves a synergistic action, not clearly understood, that results in a marked increase in heat transfer to the load, as compared with the main flames alone. Also, the impingement of the high-velocity gases on the metal bath after meltdown promotes circulation of the melt.

The effective heating action of the interacting flames is also used to marked advantage during the ordinarily difficult starting period. Firing up the furnace is greatly expedited by first igniting the supplemental burner 26 as mentioned above, and using the hot oxygen-fuel flame for in turn igniting the main coal-air burners. In prior practice wherein wood fires were sometimes used for firing-up, ignition required up to one-half hour to reach a stable flame condition; i.e. normal generation of heat at a steady combustion rate. It was found in heat tests of the invention equipment disclosed that the supplemental burner flame greatly accelerated stabilization of the main flames so that they were ignited for stabilized flame within 5 minutes. The igniting action of the supplemental flame OF will be apparent from the descriptions of FIGS. 4 and 5, considering the main flame regions at $CA_1$ and $CA_2$ as corresponding generally with the regions of mixed powdered coal and air initially projected from the main burners.

The improvements in meltdown time and overall furnace performance were no less significant. After 2½ hours of burner operation as described above, with a furnace charge of 40,000 pounds, apparently complete melting of the charge with good metal circulation was observed. Poling of the melt at that time revealed no unmelted solid scrap on the furnace bottom, thus indicating in general approximately 40 percent to 50 percent reduction in meltdown time. For alloying and obtaining a uniform temperature throughout the melt for tapping, the supplemental and main burners were normally operated at the same rate for another hour, after which the melt was drawn from the furnace at the desired tap temperature of 2,600° F., for normal casting. The total finish charge-to-tap time for the invention process therefore amounts to approximately 3½ hours.

As regards improved overall furnace performance, stack emissions were noticeably light and no unburned carbon following flame stabilization was observed in the flue or stack, thus indicating good fuel economy and greatly reduced air pollution from the stack. In fact, comparison of fuel consumption with that for conventional coal-fired furnace operation revealed a decrease of over 50 percent for similar furnace charges.

There was no excessive oxidation of alloy elements in any of the test heats observed, the elements including carbon up to 4.0 percent, chromium to 12 percent, nickel to 2 percent, and manganese to 1 percent. Subsequent chemical analysis revealed that all metal losses were well below the expected normal losses.

The refractory surface temperatures in the observed heats did not exceed the normal temperatures required for meltdown and superheat; accordingly, as the refractories are at superheat temperatures for much shorter periods of time, they are subject to less thermal and mechanical erosion and damage than for the conventional coal-fired operation.

Considering the economic aspects of the invention, it will be seen that the combined tangible savings and benefits including greatly reduced fuel costs, longer furnace life, increased production resulting from less meltdown time, and high product quality more than offset oxygen costs so as to make the invention process economically acceptable.

In summary, there are achieved by the invention process rapid coal flame ignition and stabilization at start; high rate of heat release from both the coal-air and oxygen-fuel flames with consequent reductions in meltdown and superheat time; practical elimination of an oxidizing atmosphere within the furnace by rapid combination of all the available oxygen with burner fuel, and marked reduction of unburned fuel and visible stack fumes discharged to atmosphere.

Although the invention in the disclosed embodiment is applied by way of example to furnaces for melting down scrap metal, it will be apparent that it can be applied as well to furnaces of the open hearth type and to other apparatus requiring load heating of similar character. Also, depending on economic and other factors, the main burners can use fuel other than powdered coal, such as fuel oil for example.

In some installations where the size of the furnace must be taken into consideration, the number of supplemental and main burners may be increased in accordance with the invention adequately to cover the load surface to be heated; also in smaller furnaces a wide-exhaust single main burner with the supplemental oxygen-fuel burner may be adequate for supplying sufficient heat to the load. In this connection, the nature of the load, i.e. ferrous or nonferrous, may determine its disposition with respect to the furnace flames. For ferrous loads such as cast iron scrap, steel alloys, pig iron and the like, the disclosed loading is preferable; however, nonferrous metals such as aluminum and zinc are preferably loaded at the far end of the furnace a suitable distance from the hottest region of the oxygen-fuel flames.

Having set forth the invention in what is considered to be the best embodiment thereof, it will be understood that changes may be made in the system and apparatus as above set forth without departing from the spirit of the invention or exceeding the scope thereof as defined in the following claims.

I claim:

1. In a fuel-air fired furnace having at least two main fuel-air burners in a furnace wall for projecting heating flames therefrom to a furnace load, the process for accelerating transfer of heat from the flames to the load over an extended area thereof which comprises:

a. directing the projected main fuel-air flames from at least two of said fuel-air burners for convergence along the longitudinal midportion of the furnace in heat transfer relation to the load surface,
   b. projecting in the same general direction a supplemental high-temperature oxygen-fuel flame at a velocity higher than that of the main flames into the convergence of the said main flames for producing progressive flame interaction and materially increased heat transfer between the main flames and the furnace load,
   c. and proportioning the heat-generating capacity of the oxygen-fuel flame to a minor fraction of the total capacity of the main fuel-air flames.

2. The method as specified in claim 1 wherein the supplemental oxygen-fuel flame is projected as a stiff jet at about sound velocity for interacting contact with the lower velocity main fuel-air flames along an expanding fuel-oxidizing region.

3. The method as specified in claim 2 wherein the supplemental flame is angularly directed from beneath the main flames into making gradually increasing contact therewith for establishing the expanding fuel-oxidizing region.

4. The method as specified in claim 1 wherein the main and supplemental flames are initially directed along respective projected axes that lie in two planes intersecting along the midportion of the load surface.

5. The method as specified in claim 4 wherein the supplemental flame is directed along an axis making with the load surface an acute angle smaller than those made by the main axes.

6. The method as specified in claim 1 wherein the fuel air flames are projected over a part of the load surface and the high-velocity oxygen-fuel flame is projected between the fuel-air flames and load surface whereby the fuel-air flames are inducted into an expanding high-temperature region of flame interaction for achieving high rate of fuel oxidation.

7. The method as specified in claim 6 wherein the expanding region of flame interaction is formed directly above an extended area of the load surface for causing impingement thereon of the resulting high temperature, high-velocity combustion product gasses with high rate of heat transfer to the load.

8. The method as specified in claim 7 wherein the fuel in the main fuel-air flame is powdered coal, the fuel in the supplemental oxygen flame is natural gas, and the partially burned components and coal particles of the main flames are progressively drawn downwardly by inductive action into the expanding fuel-oxidizing region for complete combustion.

9. A fuel-air fired furnace for the direct transfer of flame heat to the furnace load comprising:

a. a pair of main fuel-air burners at one end of the furnace for projecting respective heating flames tending to converge and coalesce in heat transfer relation to the load surface,
   b. and a supplemental oxygen-fuel burner symmetrically mounted with respect to the main burners for projecting a comparatively stiff oxygen-fuel flame generally along and into the convergence of the main flames for progressively increasing contact therewith along an extended longitudinal section of the load surface.

10. A fuel-air fired furnace as specified in claim 9 wherein the main burners are horizontally spaced at a common level and the supplemental burner is in an intermediate position with respect to the main burners.

11. A fuel-air fired furnace as specified in claim 10 wherein the supplemental burner is offset below the horizontal level of the main burners for projecting the oxygen-fuel flame into the underside of the coalesced main flames.

12. A fuel-air fired furnace as specified in claim 9 wherein the fuel is powdered coal and the respective burners are angularly positioned for initially causing the coal-air flames partially to cover and surround the high-velocity supplemental flame, and for producing in the general region of convergence a region of extensive interacting contact between the supplemental and main flames within which high-temperature oxidation of coal particles from the main flames is completed.

13. A fuel-air fired furnace as specified in claim 12 wherein the stiff supplemental flame progressively draws coal and unburned carbon particles into an expanding generally conical high-temperature region of complete combustion spanning an extensive midportion of the load surface.

14. A fuel-air fired furnace as specified in claim 13 wherein the flame temperature in the region of initial interacting flame contact is approximately 5,000° F., and the temperature in the diverging part of the conical region is approximately 2,600° F., for establishing high rate of heat transfer to the load surface over an extended area thereof.

15. A furnace for melting a metal charge comprising a refractory-lined enclosure adapted to contain said charge and the resulting molten metal bath, a pair of air-fuel burners mounted in the wall portion of said enclosure, means mounting said air-fuel burners to direct converging and coalescing air-fuel flames into said enclosure to reduce the metal charge, a supplemental oxyfuel burner mounted in the wall portion of said enclosure, means mounting said oxyfuel burner to direct a high-temperature, high-velocity oxyfuel flame into the lower portions of the coalescing air-fuel flames, to thereby create an aspirating effect which tends to draw the air-fuel flames into the oxyfuel flame.

* * * * *